United States Patent [19]

Sakou et al.

[11] Patent Number: 5,448,651
[45] Date of Patent: Sep. 5, 1995

[54] TEXTURE DISCRIMINATION METHOD

[75] Inventors: Hiroshi Sakou, Shiki; Hitoshi Matsushima, Tachikawa, both of Japan

[73] Assignee: Hitachi, Ltd., Tokyo, Japan

[21] Appl. No.: 267,552

[22] Filed: Jun. 21, 1994

Related U.S. Application Data

[63] Continuation of Ser. No. 496,228, Mar. 20, 1990, abandoned.

[30] Foreign Application Priority Data

Mar. 20, 1989 [JP] Japan .................................. 1-66122

[51] Int. Cl.6 ............................................. G06K 9/34
[52] U.S. Cl. .................................. 382/176; 382/171; 382/271
[58] Field of Search .................. 382/9, 18, 28, 48, 51, 382/52, 62, 39, 54

[56] References Cited

U.S. PATENT DOCUMENTS

| | | | |
|---|---|---|---|
| 4,339,745 | 7/1982 | Barber et al. | 382/8 |
| 4,408,181 | 10/1983 | Nakayama | 382/61 |
| 4,550,435 | 10/1985 | Hayman | 382/52 |
| 4,574,395 | 3/1986 | Kato | 382/61 |
| 4,769,849 | 9/1988 | Alsing | 382/9 |
| 5,048,096 | 9/1991 | Beato | 382/9 |
| 5,065,444 | 11/1991 | Garber | 382/54 |
| 5,073,953 | 12/1991 | Westdijk | 382/9 |

OTHER PUBLICATIONS

Proc. of the 1st Int. Conference on Computer Vision, Jun. 8, 1987, London, GB, pp. 439–443; W. E. Blanz et al: "Control-free low-level image segmentation: theory, architecture, and experimentation".
Electronics and Communications in Japan; vol. 71, No. 6, Jun. 1988, Silver Spring, Md., US; pp. 76–85; O. Nakamura et al: "Extraction of photographic area from document images".

*Primary Examiner*—Leo H. Boudreau
*Attorney, Agent, or Firm*—Fay, Sharpe, Beall, Fagan, Minnich & McKee

[57] ABSTRACT

To reliably discriminate the characters only from the headlines having any background textures, the present invention analyzes the projection profile of a grey image in a headline area in order to automatically set a learning area A in the area of background texture only of the periphery in the headline area, and set a learning area B in the area that includes background texture of a central portion and characters; determines a discriminant function having, as variables, characteristics that use a plurality of pixel densities in the vicinity of a pixel which is processed so that output values of the discriminant function at each of the positions in the learning area A forms a profile with an average Va, that the output values at each of the positions in the learning area B forms a profile with an average Vb, and that the sum of dispersion values of the two profiles becomes smaller than a predetermined value, in order to discriminate in which area is included the pixel which is processed in the headline area; and determines in which area of the background pattern or the characters the pixel is included depending upon whether the output value of the discriminant function is close to the value Va or to the value Vb for each of the pixels in the headline area, in order to discriminate the headline area into areas.

6 Claims, 6 Drawing Sheets

TEXTURE DISCRIMINATION METHOD

This is a continuation of application Ser. No. 07/496,228, fled Mar. 20, 1990, now abandoned.

BACKGROUND OF THE INVENTION

The present invention relates to texture discrimination which is best adapted to discriminating the whole area, in which two kinds of textures are present in a mixed manner, into the areas for each of the kind of textures, and particularly which is best adapted to automatically discriminating the characters from a headline area with a background texture of a printed matter such as a newspaper, a magazine or the like.

Accompanying the widespread use of personal computers or word processors and the reduction in the cost of the recording media in recent years, documents in the form of data base and electronic filing of printed matter have been occupying important positions in office automation. In particular, it has been desired to construct an automatic document register/retrieval system capable of storing data contained in the printed documents such as newspaper, magazines and official documents, and capable of retrieving required information only therefrom. At the time of registering, this system automatically divides, first, the document into a headline area, a text area and a photo area through image processing. In the former two areas, the characters are encoded by character recognition and, then, character code sequences and photo image data are registered. With the file registered in such a form, the cost for storage and transfer is cheaper and the retrieval of contents is easier than when the whole document is stored as an image. In an attempt to develop such systems, therefore, study and research have been as described, for example, in the Trans. of IEICE (the Institute of Electronics, Information and Communication Engineers of Japan) "A Method of Document-Image Segmentation based on Projection Profiles, Stroke Densities and Circumscribed Rectangles", Vol. J69-D, No. 8, August, 1986.

SUMMARY

According to the above-mentioned system, a character sequence in the headline area includes key words of the content of the text, and the storage of the character sequence in an encoded form has an important meaning. The headline character sequence added as key words to the text data makes it easy to retrieve the content. Although it is important to pick up the characters in the headline area, a difficult assignment is involved. The headline of an important article of a newspaper and the like has a texture as background of the characters to draw attention. Therefore, even if the headline area could be detected by the aforementioned conventional art, it is difficult to pick up the character sequences only from such an area with a texture through a simple processing. This is because, with the binary processing based on a simple grey level, background texture is picked up together with the characters. The texture discrimination method of this type has been disclosed in, for example, Trans. of IEICE (the Institute of Electronics, Information and Communication Engineers of Japan), "Texture Analysis by Self-Organization Method", Vol. J67-D, No. 1, January, 1984. With this method, however, the size of the element of the texture must have been known. Moreover, the background texture of the headline area is usually different depending upon the headlines, which makes it difficult to design optimum discrimination processings despite several kinds of textures being taken into consideration in advance.

The present invention involves the above-mentioned analysis, and its object is to reliably discriminate the characters only from the headlines having any background textures.

In order to achieve the above object, the present invention; analyzes the projection profile of a grey image in a headline area in order to automatically set a learning area A in the area of background texture only of the periphery in the headline area, and set a learning area B in the area that includes background texture and characters; determines a discriminant function having, as variables, characteristics that use a plurality of pixel densities in the vicinity of a pixel which is processed so that output values of the discriminant function at each of the positions in the learning area A forms a profile with an average Va, that the output values at each of the positions in the learning area B forms a profile with an average Vb, and that the sum of dispersion values of the two profiles becomes smaller than a predetermined value, in order to discriminate in which area is included the pixel which is processed in the headline area; and determines in which area of the background textures or the characters the pixel is included depending upon whether the output value of the discriminant function is close to the value Va or to the value Vb for each of the pixels in the headline area, in order to discriminate the headline area into areas.

The aforementioned steps make it possible to automatically set a discriminant function for texture discrimination for each of the headline areas, and characters can be discriminated from the headlines having any background textures.

BRIEF DESCRIPTION OF THE DRAWINGS

Further objects, features and advantages of the present invention will become more clear upon the following detailed description of preferred embodiments as shown in the drawing, wherein:

FIG. 1(*b*) is a diagram explaining how to set a learning area A and a learning area B in the method of picking up characters according to the present invention;

FIG. 1(*c*) is a diagram showing the result of picking up the characters by the character pick-up method of the present invention;

DETAILED DESCRIPTION

An embodiment of the present invention will now be described in detail in conjunction with the drawings.

Figure 2:
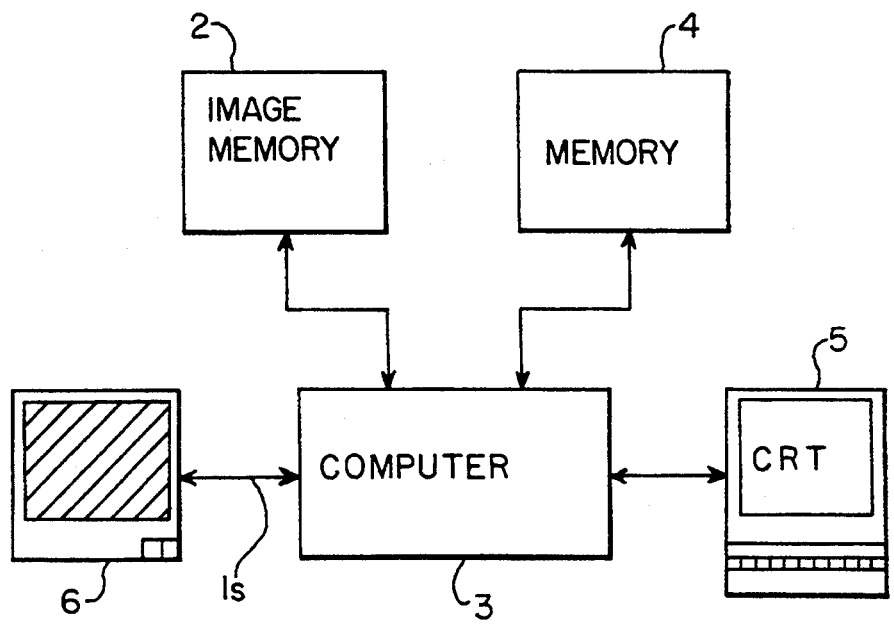
FIG. 2 is a diagram showing the whole constitution of an automatic document register/retrieval system to which the present invention is adapted.

FIG. 2 illustrates the whole constitution of an automatic document register/retrieval system which employs the texture discrimination of the present invention. First, the image information of a printed matter 1 such as a Japanese newspaper or the like is converted into digital signals through a scanner 6 and is stored in an image memory 2 as a two-dimensional image. Next, using a computer 3, the image in the image memory 2 is divided into a headline area, a text area and a photo area. This can be done by the aforementioned conventional technique which is based on projection profiles, stroke densities and circumscribed rectangles. After the characters are discriminated from the headline area by the texture discrimination of the present invention, the character sequence is encoded by known character recognition. The encoded data groups are filed for every article and are stored in a memory 4. The CRT terminal 5 is used by a user to instruct the content of work to be performed to the computer 3 at the time of registering and retrieval.

Figure 3B:
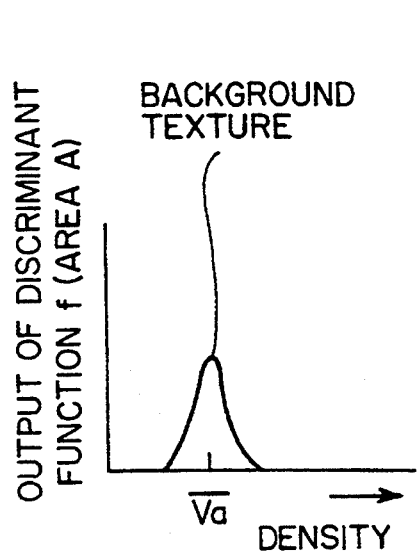
FIGS. 3(*a*) and (*b*) are diagrams showing the output conditions of discriminant functions.
Figure 3A:
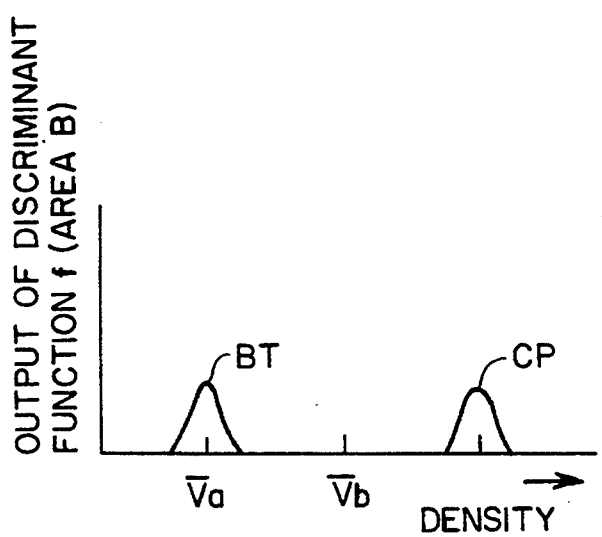

A method of discriminating characters from the headline area to which the present invention is directly concerned will now be described in conjunction with FIG. 1(a). The final purpose is to discriminate the character portion C from the headline area M that has a background texture T as shown in FIG. 1(b). Step 1 in FIG. 1(a) sets a learning area A of only the background texture without characters in a peripheral portion only of the headline area, and sets a learning area B that has background texture and characters, as shown in FIG. 1(b). The headline area with background texture of a printed matter usually has areas A of textures only in the periphery thereof. These areas A can be automatically set by a method that will be described later. Step 2 determines a discriminant function f having, as variables, character quantities that use a plurality of pixel densities in the vicinity of a pixel which is processed. The function f is determined so that output values of the discriminant function f at each of the positions of the area A form a profile with an average value Va, output values of the discriminant function at each of the positions of the area B form a profile with an average value Vb, that the sum of dispersion values of the two profiles becomes smaller than a predetermined value S. Therefore, despite the average value Vb of all of the outputs of the area B, the background texture portion only of the area B forms a profile with an average value Va and the remaining character portion forms a profile of a different value. Therefore, the two areas can be discriminated. FIGS. 3(a) and (b) illustrates relationships of these profiles showing background texture BT and character portion CP. Step 3 determines in which profile the output value of the discriminant function is included for each of the positions in the whole headline area. The step 3 produces 1 when the output value is included in the profile of the character portion and produces 0 when the output value is included in the profile of only the texture portion. Thus, the character portion C is found as shown in FIG. 1(b). Step 4 cuts out a character and recognizes a character from the image data of character portion C by the analysis of projection profiles, and converts the character portion C into a character code sequence by optical character recognition, OCR.

Figure 1:
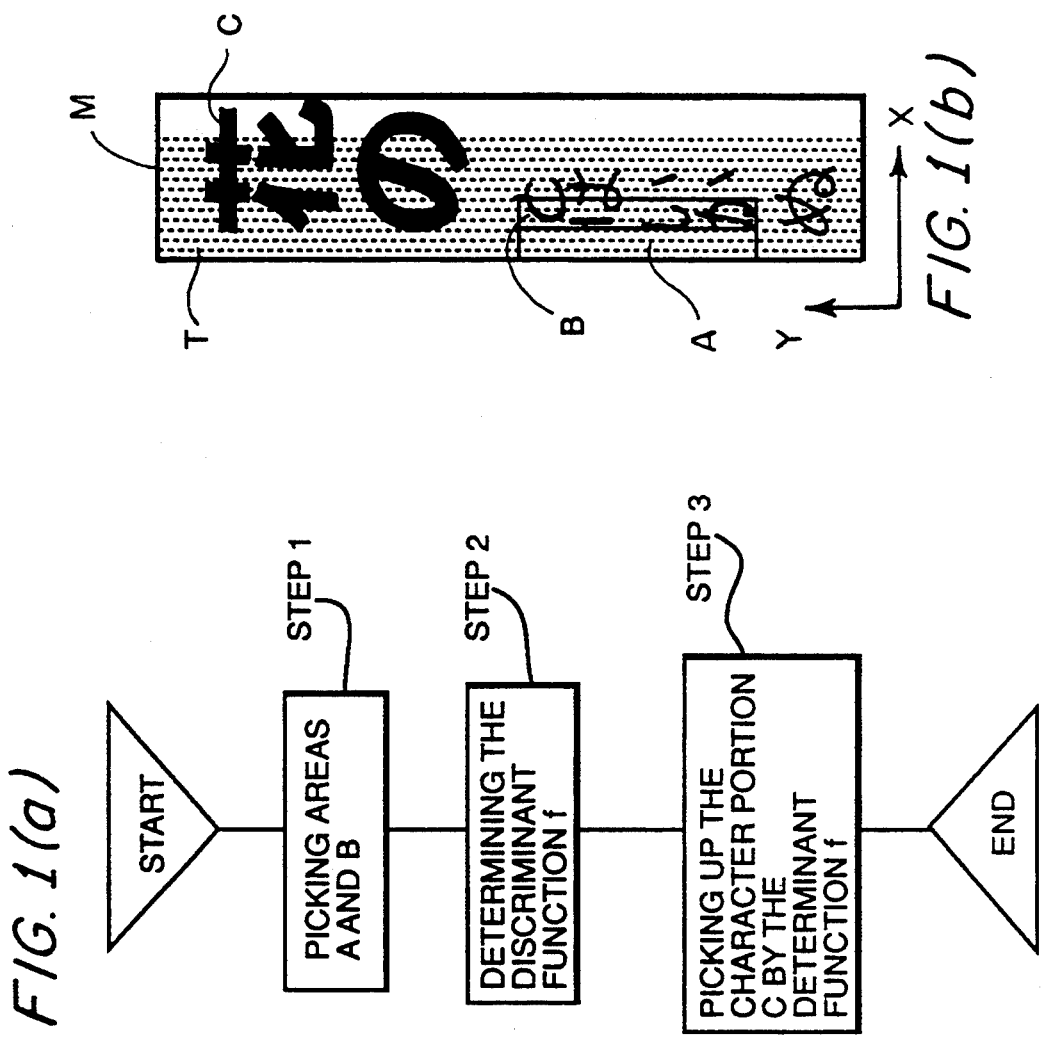
FIG. 1(*a*) is a diagram explaining a method of picking up characters according to the present invention.
Figure 4:
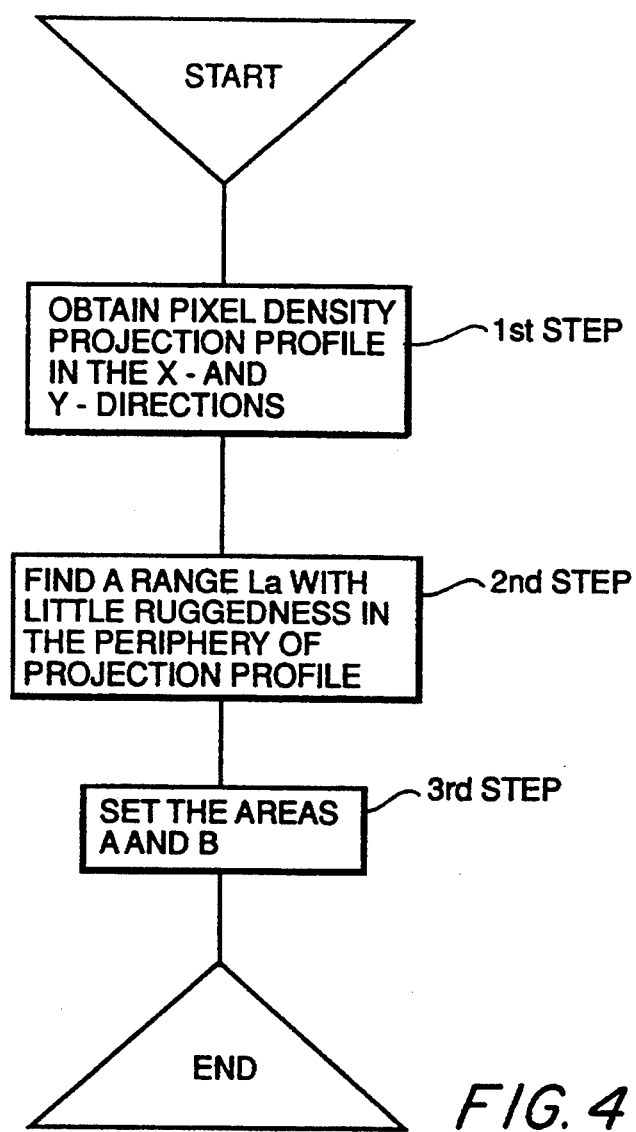
FIG. 4 is a flowchart explaining the method of setting the learning areas A and B.
Figure 5:
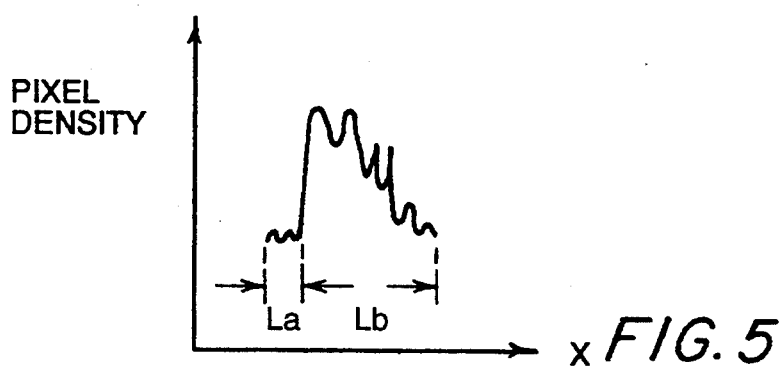
FIG. 5 is a diagram which shows a projection profile.

FIG. 4 illustrates a method of setting the learning areas A and B in step 1 of FIG. 1(a). In the first step, pixel density projection profiles are found in the X- and Y-directions of the headline region, and a suitable smoothing processing is effected for each of the profiles. FIG. 5 shows the results thereof. In the headline with background texture, in general, there exists a region of background texture only along the periphery of the headline. Therefore, the pixel density projection profile of either the X-direction or the Y-direction has a small degree of ruggedness, and the character area has a conspicuously rugged profile. Therefore, a second step finds a range La having a pixel density projection profile of either the X-direction or the Y-direction with little ruggedness (that is, little change in pixel density as compared to the other ranges of the profile) in the periphery of the headline area based on the threshold processing of the projection profiles. A third step sets the learning area A shown in FIG. 1(b) based on the range La found in the second step. Here, the learning area B may be a range Lb having conspicuous ruggedness on the profile.

Figure 6:
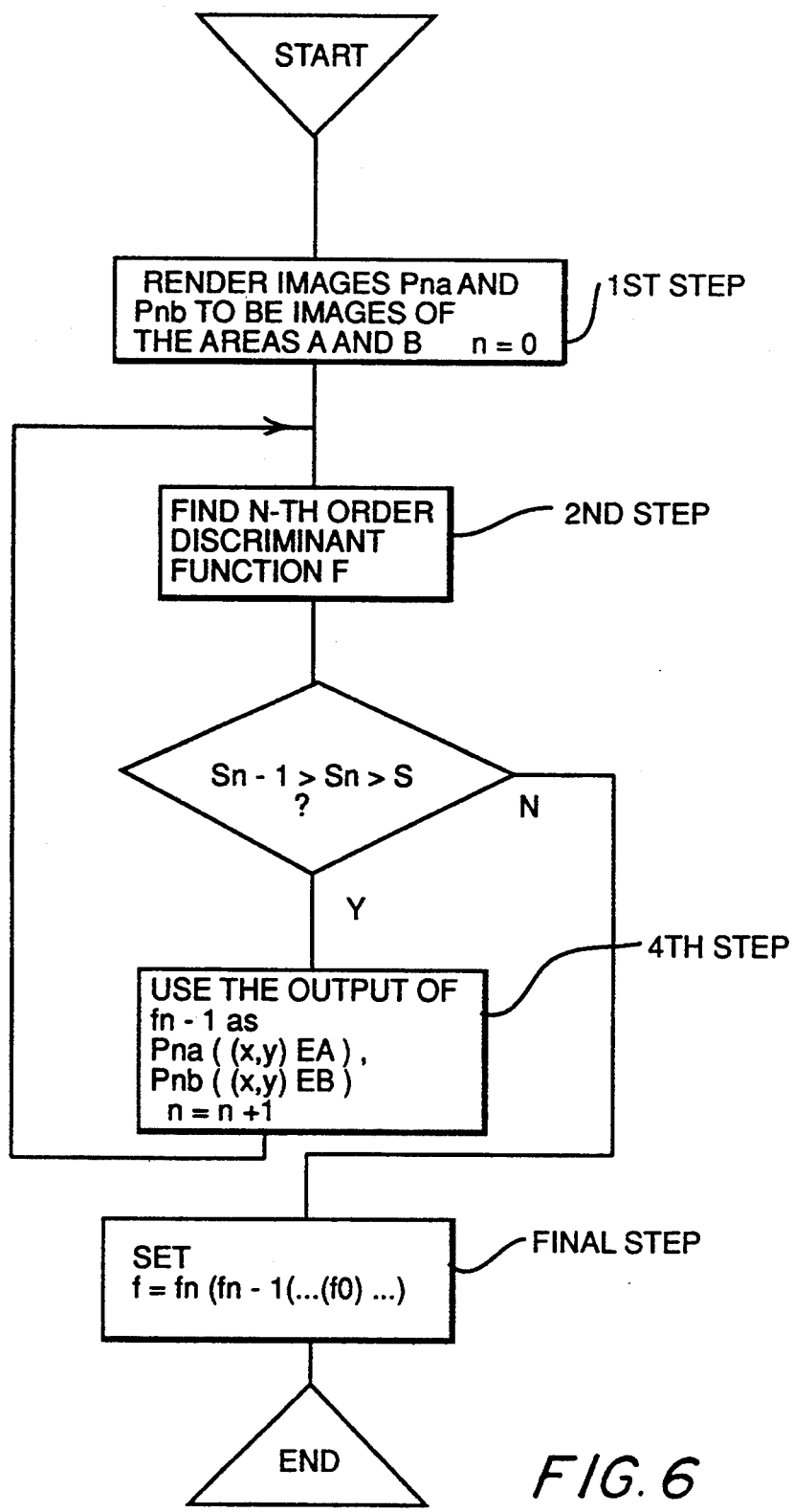
FIG. 6 is a flowchart explaining a method of finding a discriminant function.

FIG. 6 illustrates a method of determining a discriminant function in step 2 of FIG. 1(a). A first step sets the generation number n to 0, and renders the images Pna and Pnb that are to be discriminated to be the images in the areas A and B. A second step determines, based on a method that will be described later, an n-th order discriminant function $f_n(x, y)$, such that the output values of the function at each of the positions (x, y) of the image Pna form a profile with an average value Va, the output values of the function at each of the positions (x, y) of the image Pnb form a profile with an average value Vb, and that the sum Sn of dispersion values of the profiles becomes a minimum. A third step advances to the next step in the case of $Sm > Sn > S$ (where $m = n-1$, and S is a predetermined value, e.g. a constant) and advances to the final step in other cases. A fourth step renews the generation ($n = n+1$), and uses the images Pna and Pnb to be discriminated as an output value in the area A and as an output value in the area B of the m-th order discriminant function $f_m(x, y)$. The program then returns to the second step. Using a group of discriminant functions $f_0, \ldots f_n$ thus obtained, the final step sets a final discriminant function $f = f_n (f_m( \ldots (f_0) \ldots ))$.

Figure 7A:
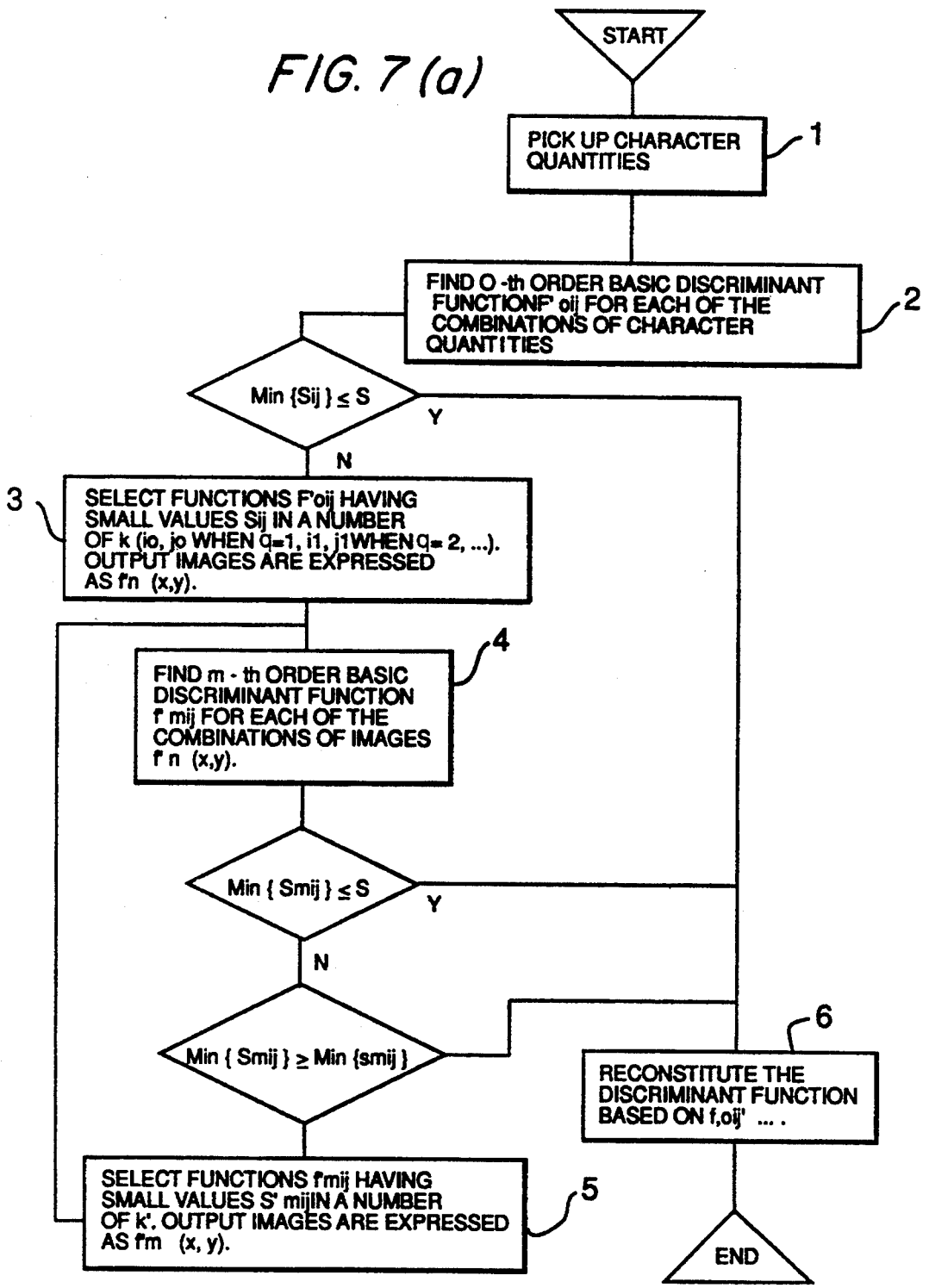
FIGS. 7(*a*), (*b*), and (*c*) are a flowchart and diagrams which explain the method of finding an n-th order discriminant function in FIG. 6.
Figure 7B:
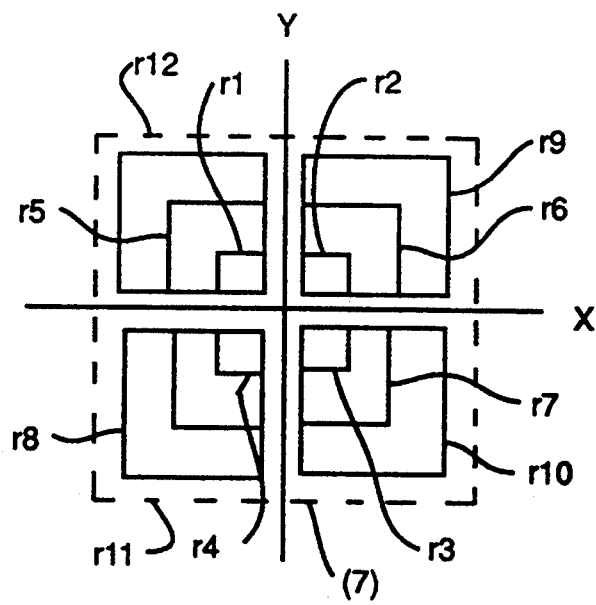
Figure 7C:
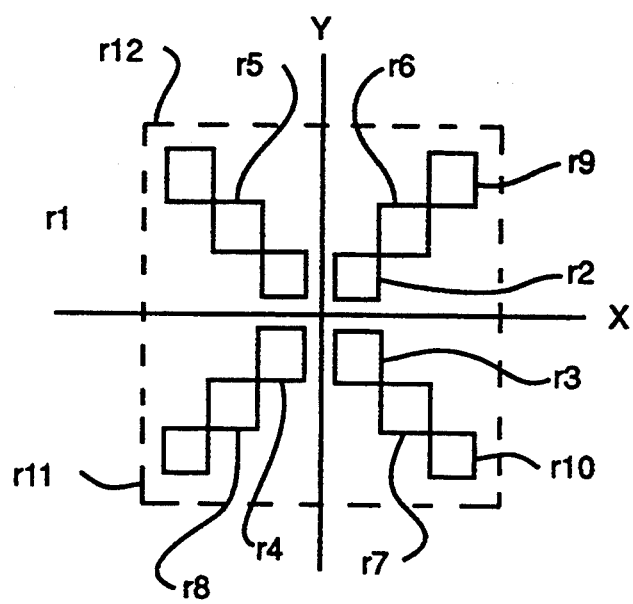

FIG. 7(a) is a flowchart of how to find the n-th order discriminant function $f_n(x, y)$ in step 2 of FIG. 6. Step (1) finds character quantities $c_1, \ldots, c_k$ of a predetermined number from the vicinity area of a predetermined size with a pixel which is processed as a center. They may be average values or densities in the subareas $r_1, \ldots, r_k$ included in the vicinity area as shown in, for example, FIG. 7(b) or FIG. 7(c). The step (2) finds, by Lagrange's method of indeterminate coefficient, unknown coefficients $a_0, a_1, a_2$ and $a_3$ of a 0-th order basic discriminant function $f_{0ij}(x, y)$ expressed by the following equation (3) such that Sij of the following equation (1) becomes a minimum for each combination $(c_i, c_j)$ of the character quantities and that the following equation (2) holds true, $$S_{ij} = (1/Sa) \sum_{(x,y) A} (f_{0ij}(x,y) - Va)^2 + \tag{1}$$

$$(1/Sb) \sum_{(x,y) B} (f_{0ij}(x,y) - Vb)^2$$

$$(1/Sa) \sum_{(x,y) A} f_{0ij}(x,y) = Va, \; (1/Sb) \sum_{(x,y) B} f_{0ij}(x,y) = Vb \tag{2}$$

$$f_{0ij}(x,y) = a_0 + a_1 c_i + a_2 c_j + a_3 c_i c_j \tag{3}$$

where Sa and Sb denote areas of the areas A and B. Processing advances from step (2) to the final step (6) when every minimum value Sij is smaller than or equal to S, and to the next step (3) in other cases. Step (3) selects k 0-th order basic discriminant functions $f'_{0ij}(x, y)$ based on the combinations $((i_0,j_0), (i_1, j_1), \ldots )$ of character quantities having small values Sij, and sends the outputs as input images to the next step (4). Here, i and j together are denoted by q (but $(i_0, j_0)$ when q=1, $(i_1, j_1)$ when q=2, $1</=q</=k$, and the input image is denoted by $f'_{nq}(x, y)$ (where $0<n$). Step (4) finds, by Lagrange's method of indeterminate coefficient, unknown $a_m0$, $a_m1$, $a_m2$ and $a_m3$ of the m-th order basic discriminant function $f'_{mij}$ (where m−n+1) expressed by the following equation (6) for each combination $(f'_{ni}(x, y), f'_{nj}(x,y))$ of input images, such that Smij of the following equation (4) becomes a minimum and that are following equation (5) holds true, $$S_{mij} = (1/Sa) \sum_{(x,y) A} (f'_{mij}(x,y) - Va)^2 + \qquad (4)$$

$$(1/Sb) \sum_{(x,y) B} (f'_{mij}(x,y) - Vb)^2$$

$$(1/Sa) \sum_{(x,y) A} f'_{mij}(x,y) = Va, (1/Sb) \sum_{(x,y) B} f'_{mij}(x,y) = Vb \qquad (5)$$

$$f'_{mij}(x,y) = a_{m0} + a_{m1}f'_{ni}(x,y) + a_{m2}f'_{nj}(x,y) + a_{m3}f'_{ni}(x,y)f'_{nj}(x,y) \qquad (6)$$

Advance is to the final step (6) when the minimum value Smij is smaller than or equal to S or when the minimum value Smij is greater than or equal to the minimum value Snij, and advance is to the next step (5) in other cases. Step (5) selects m-th order basic discriminant functions $f'_{mij}(x, y)$ having small values Smij in a number of k', and sends the outputs as input images $f'_{mq}(x, y)$ (where q=k') to the step (4). Step (4) is repeated as described above to gradually decrease the dispersion value Smij and the final step (6) is reached when the dispersion value Smij is converged. When the minimum value Smij or Sij is smaller than S in the final step (6), a master basic discriminant function is sought reversely from the m-th order basic discriminant function $f'_{mij}(x, y)$ having the minimum value in order to reconstitute a discriminant function that is to be found. When the minimum value Smij is greater than the minimum value Snij, a master basic discriminant function is sought reversely from the n-th order basic discriminant function $f'_{nij}(x, y)$ having the minimum value in order to reconstitute a discriminant function that is to be found. The routine of FIG. 7(a) is thus finished. An important feature is that the discriminant function that is found is in the form of a polydimensional polynominal equation having a predetermined number of characteristics $c_1, \ldots, c_k$ in the vicinity area of a given size with a pixel which is processed as a center.

In summary, the steps shown in FIG. 6 and FIG. 7(a) are used to determine a discrimination function having, as variables, a plurality of densities from the vicinity area of a pixel which is processed. The output values of the discriminant function at each of the positions of the area A form a profile with an average value Va. The output values of the discriminant function at each of the positions of the area B form a profile with an average value Vb. The sum of the dispersion values of the two profiles is smaller than a predetermined value S. The steps of FIG. 7(a) find a discriminant function f expressed in a multidimensional polynominal form having a predetermined number of character quantities $c_1, \ldots, c_k$ in the vicinity area of a predetermined size with a pixel which is processed as a center, such that the sum of dispersion values of the two profiles becomes a minimum. The steps of FIG. 6 apply the second step again to the discriminant function $f_n$ in order to minimize the sum of dispersion values of the two profiles. That is, the steps of FIG. 6 repeat the second step to gradually expand the vicinity area, and to find a plurality of character quantities by which the texture can be discriminated (dispersion value becomes smaller than S) and a discriminant function which consists of the character quantities. Then, as shown in FIG. 3(b), the background textured area in the area A forms a profile of small dispersion values with average value Va. Since the background textured area in the area A forms a profile BT with average value Va and the remaining character portion forms a profile CP having different values, the character portion can be discriminated by determining whether the output value of the discriminant function is close to the value VA or the value Vb. The result of picking up the characters is shown in FIG. 1(c).

The above embodiment has explained the present invention by picking up the characters from the headline area of a printed document. However, it is also possible to pick up particular tissues from the image of living body tissues and to pick up particular areas from the image of aerial photograph by setting the learning areas A and B, and by obtaining a discriminant function of the present invention.

According to the present invention as described above, the learning areas A and B are automatically set for two textured areas, and an optimum discriminant function for texture discrimination is obtained by using the learning areas. Therefore, the texture can be discriminated flexibly even in case a pattern consisting of an unknown texture is encountered.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A character recognition apparatus for discriminating an image into characters and a textured background, comprising:

a computer;

a memory coupled to the computer;

a scanner coupled to the computer and optically scanning the printed image and producing digital data for each of a plurality of pixels to provide a virtual image, and the digital data including pixel densities in a character portion of the virtual image containing the characters and the textured background;

said memory including an image memory storing the digital data as a record of the pixel densities in a matrix corresponding to locations of the pixels in the character portion;

said memory including a program memory storing a program;

said computer running the program and locating, in the virtual image, a learning area A containing only the textured background and a learning area B containing both the textured background and at least a part of the characters;

said memory storing a plurality of different discriminant functions that each include the digital pixel density information of a pixel being processed and pixels in the immediate adjacent vicinity of the pixel being processed;

said memory storing an identification of the learning area A and the learning area B;

said computer running the program and retrieving from said memory at least a part of the stored digital data as digital pixel density information by using the identification;

said computer running the program and determining a specific discriminant function by producing output values of the plurality of different discriminant functions that each include the digital pixel density information of a pixel being processed and pixels in the immediate adjacent vicinity of the pixel being processed separately for each of the learning areas A and B, and selecting one of the plurality of different discriminant functions as the specific discriminant function based upon the output values of the one of the plurality of different discriminate functions for learning area A and learning area B best satisfying a criteria when compared to the output values of the others of the plurality of different discriminant functions;

said memory storing, under control of the computer, accumulated statistics of the output values of the specific discriminant function for a plurality of different pixels being processed for at least one of the learning areas A and B;

said computer running the program and discriminating with the specific discriminant function whether each pixel, of the virtual image, is part of the characters or part of the textured background by comparing an output value of the specific discriminant function for the each pixel as the pixel being processed with the stored accumulated statistics of the output values of the specific discriminant function for a plurality of different pixels of at least one of the learning areas A and B, so that said discriminating discriminates that part of the digital data representing the characters from the virtual image containing the characters and textured background with respect to at least the learning area B;

said memory storing the part of the digital data;

said computer running the program, and retrieving from said memory and converting the .part of the digital data of the virtual image into digital encoded information providing codes for corresponding discrete ones of the characters;

wherein said specific discriminant function produces dispersion values for learning areas A and B that are substantially non-overlapping and mutually exclusive; and wherein the specific discriminant function has a sum of its dispersion values less than or equal to a predetermined value as the criteria and includes iterative steps using Lagrange's method of indeterminate coefficients.

2. A character recognition apparatus for discriminating an image into characters and a textured background, comprising:

a computer;

a memory coupled to the computer;

a scanner coupled to the computer and optically scanning the printed image and producing digital data for each of a plurality of pixels to provide a virtual image, and the digital data including pixel densities in a character portion of the virtual image containing the characters and the textured background;

said memory including an image memory storing the digital data as a record of the pixel densities in a matrix corresponding to locations of the pixels in the character portion;

said memory including a program memory storing a program;

said computer running the program and locating, in the virtual image, a learning area A containing only the textured background and a learning area B containing both the textured background and at least a part of the characters;

said memory storing a plurality of different discriminant functions that each include the digital pixel density information of a pixel being processed and pixels in the immediate adjacent vicinity of the pixel being processed;

said memory storing an identification of the learning area A and the learning area B;

said computer running the program and retrieving from said memory at least a part of the stored digital data as digital pixel density information by using the identification;

said computer running the program and determining a specific discriminant function by producing output values of the plurality of different discriminant functions that each include the digital pixel density information of a pixel being processed and pixels in the immediate adjacent vicinity of the pixel being processed separately for each of the learning areas A and B, and selecting one of the plurality of different discriminant functions as the specific discriminant function based upon the output values of the one of the plurality of different discriminate functions for learning area A and learning area B best satisfying a criteria when compared to the output values of the others of the plurality of different discriminant functions;

said memory storing, under control of the computer, accumulated statistics of the output values of the specific discriminant function for a plurality of different pixels being processed for at least one of the learning areas A and B;

said computer running the program and discriminating with the specific discriminant function whether each pixel, of the virtual image, is part of the characters or part of the textured background by comparing an output value of the specific discriminant function for the each pixel as the pixel being processed with the stored accumulated statistics of the output values of the specific discriminant function for a plurality of different pixels of at least one of the learning areas A and B, so that said discriminating discriminates that part of the digital data representing the characters from the virtual image containing the characters and textured background with respect to at least the learning area B;

said memory storing the part of the digital data;

said computer running the program, and retrieving from said memory and converting the part of the digital data of the virtual image into digital encoded information providing codes for corresponding discrete ones of the characters;

wherein said specific discriminant function determines separate values corresponding to the average pixel density of learning areas A and B; and wherein the specific discriminant function has a sum of its dispersion values less than or equal to a predetermined value as the criteria and includes iterative steps using Lagrange's method of indeterminate coefficients.

3. A character recognition apparatus for discriminating an image according to claim 1, wherein the specific discriminant function is in the form of a polydimensional polynomial equation.

4. A character recognition apparatus for discriminating an image according to claim 2, wherein the specific discriminant function is in the form of a polydimensional polynomial equation.

5. A character recognition apparatus for discriminating an image into characters and a textured background, comprising:

a computer;

a memory coupled to the computer;

a scanner coupled to the computer and optically scanning the printed image and producing digital data for each of a plurality of pixels to provide a virtual image, and the digital data including pixel densities in a character portion of the virtual image containing the characters and the textured background;

said memory including an image memory storing the digital data as a record of the pixel densities in a matrix corresponding to locations of the pixels in the character portion;

said memory including a program memory storing a program;

said computer running the program and locating, in the virtual image, a learning area A containing only the textured background and a learning area B containing both the textured background and at least a part of the characters;

said memory storing a plurality of different discriminant functions that each include the digital pixel density information of a pixel being processed and pixels in the immediate adjacent vicinity of the pixel being processed;

said memory storing an identification of the learning area A and the learning area B;

said computer running the program and retrieving from said memory at least a part of the stored digital data as digital pixel density information by using the identification;

said computer running the program and determining a specific discriminant function by producing output values of the plurality of different discriminant functions that each include the digital pixel density information of a pixel being processed and pixels in the immediate adjacent vicinity of the pixel being processed separately for each of the learning areas A and B, and selecting one of the plurality of different discriminant functions as the specific discriminant function based upon the output values of the one of the plurality of different discriminate functions for learning area A and learning area B best satisfying a criteria when compared to the output values of the others of the plurality of different discriminant functions;

said memory storing, under control of the computer, accumulated statistics of the output values of the specific discriminant function for a plurality of different pixels being processed for at least one of the learning areas A add B;

said computer running the program and discriminating with the specific discriminant function whether each pixel, of the virtual image, is part of the characters or part of the textured background by comparing an output value of the specific discriminant function for the each pixel as the pixel being processed with the stored accumulated statistics of the output values of the specific discriminant function for a plurality of different pixels of at least one of the learning areas A and B, so that said discriminating discriminates that part of the digital data representing the characters from the virtual image containing the characters and textured background with respect to at least the learning area B;

said memory storing the part of the digital data;

said computer running the program, and retrieving from said memory and converting the part of the digital data of the virtual image into digital encoded information providing codes for corresponding discrete ones of the characters;

wherein said program for determining includes the criteria that the output values of the specific discriminant function at each of the locations of the learning area A forms a profile with an average value Va, that the output values at each of the locations of the learning area B form a profile with an average value Vb, and that the sum of dispersion values of the two profiles becomes smaller than a predetermined value; and said program for discriminating including discriminating in which of the textured background or the characters each pixel is included based upon whether the output value of the specific discriminant function is close to the value Va or to the value Vb for each of the pixels.

6. A character recognition apparatus for discriminating an image into characters and a textured background, comprising:

a computer;

a memory coupled to the computer;

a scanner coupled to the computer and optically scanning the printed image and producing digital data for each of a plurality of pixels to provide a virtual image, and the digital data including pixel densities in a character portion of the virtual image containing the characters and the textured background;

said memory including an image memory storing the digital data as a record of the pixel densities in a matrix corresponding to locations of the pixels in the character portion;

said memory including a program memory storing a program;

said computer running the program and locating, in the virtual image, a learning area A containing only the textured background and a learning area B containing both the textured background and at least a part of the characters;

said memory storing a plurality of different discriminant functions that each include the digital pixel density information of a pixel being processed and pixels in the immediate adjacent vicinity of the pixel being processed;

said memory storing an identification of the learning area A and the learning area B;

said computer running the program and retrieving from said memory at least a part of the stored digital data as digital pixel density information by using the identification;

said computer running the program and determining a specific discriminant function by producing output values of the plurality of different discriminant functions that each include the digital pixel density information of a pixel being processed and pixels in the immediate adjacent vicinity of the pixel being processed separately for each of the learning areas A and B, and selecting one of the plurality of different discriminant functions as the specific discriminant function based upon the output values of the one of the plurality of different discriminate functions for learning area A and learning area B best satisfying a criteria when compared to the output values of the others of the plurality of different discriminant functions;

said memory storing, under control of the computer, accumulated statistics of the output values of the specific discriminant function for a plurality of different pixels being processed for at least one of the learning areas A and B;

said computer running the program and discriminating with the specific discriminant function whether each pixel, of the virtual image, is part of the characters or part of the textured background by comparing an output value of the specific discriminant function for the each pixel as the pixel being processed with the stored accumulated statistics of the output values of the specific discriminant function for a plurality of different pixels of at least one of the learning areas A and B, so that said discriminating discriminates that part of the digital data representing the characters from the virtual image containing the characters and textured background with respect to at least the learning area B;

said memory storing the part of the digital data;

said computer running the program, and retrieving from said memory and converting the part of the digital data of the virtual image into digital encoded information providing codes for corresponding discrete ones of the characters;

wherein said program for determining a specific discriminant function includes determining a polynomial discriminant function f' having, as variables, character quantities that use a plurality of pixel densities in a predetermined vicinity area of a pixel being processed, such that output values of the polynomial discriminant function f' at each of the positions of the learning area A of the image form a profile with an average value Va, that the output values of the polynomial discriminant function f' at each of the positions of the learning area B form a profile with an average value Vb, and that the sum of dispersion values of these profiles becomes a minimum;

said program for determining a discriminant function f' further includes:

finding an average density in the subareas $r_1, \ldots r_k$ included in the vicinity of the pixel being processed as character quantities $c_1, \ldots c_k$, finding, by Lagrange's method of indeterminate coefficient, unknown coefficients a0, a1, a2 and a3 of a 0-th order basic discriminant function $f'_{0ij}(x, y)$ expressed by the following equation (3) such that the sum Sij of the following equation (1) becomes a minimum for each combination (ci, cj) of the character quantities and that the following equation (2) holds true, $$S_{ij} = (1/Sa) \sum_{(x,y) A} (f'_{0ij}(x,y) - Va)^2 + \quad (1)$$

$$(1/Sb) \sum_{(x,y) B} (f'_{0ij}(x,y) - Vb)^2$$

$$(1/Sa) \sum_{(x,y) A} f'_{0ij}(x,y) = Va, \; (1/Sb) \sum_{(x,y) B} f'_{0ij}(x,y) = Vb, \quad (2)$$

$$f'_{0ij}(x,y) = a_0 + a_1 c_i + a_2 c_j + a_3 c_i c_j, \quad (3)$$

where Sa and Sb denote areas of the learning areas A and B;

advances to reconstituting, below, when the minimum value Sij is smaller than S (a fixed value) and advances to the next step in other cases, selects k (an integer) 0-th order basic discriminant functions $f'_{0ij}(x, y)$ based on combinations ((io, io), (i1, j1), . . .) of character quantities of small Sij values, and sends the outputs as input images to the following finding, finding, by Lagrange's method of indeterminate coefficient, unknown coefficients am0, am1, am2 and am3 (wherein m=n+1) of an m-th order basic discriminant function (f'mij(x, y) expressed by the following equation (6) for each combination (f'ni(x, y) f'nj(x, y)) of the input images such that Smij of the following equation (4) becomes a minimum and that the following equation (5) holds true, $$S_{mij} = (1/Sa) \sum_{(x,y) A} (f'_{mij}(x,y) - Va)^2 + \quad (4)$$

$$(1/Sb) \sum_{(x,y) B} (f'_{mij}(x,y) - Vb)^2$$

$$(1/Sa) \sum_{(x,y) A} f'_{mij}(x,y) = Va, \; (1/Sb) \sum_{(x,y) B} f'_{mij}(x,y) = Vb, \quad (5)$$

$$f'_{mij}(x,y) = a_{m0} + a_{m1}f'_{ni}(x,y) + a_{m2}f'_{nj}(x,y) + a_{m3}f'_{ni}(x,y)f'_{nj}(x,y) \quad (6)$$

where i and j together are denoted by q (but (io,jo) when q=1, (i1j1) when q=2, . . . , $1 </= q </= k$), the input image is denoted by f'nq(x, y) (where $0 </= n$), and Sa and Sb denote areas of the learning areas A and B, advances to the final reconstituting when the minimum value $S_{mij}$ is smaller than or equal to S or when the minimum value $S_{mij}$ is greater than or equal to the minimum value $S_{nij}$, and advances to the following selecting in other cases, selecting m-th order basic discriminant functions f'mij(x, y) having k' small values Smij, and sending the outputs as input images f'mq(x,y)(where q—k'), and when the minimum value Smij or Sij is smaller than S, reconstituting a discriminant function f' that is to be found by reversely seeking a master basic discriminant function from the m-th order basic discriminant function f'mij(x,y) having the minimum value, and which, when the minimum value Smij is greater than the minimum value Snij, reconstituting a discriminant function f' that is to be found by reversely seeking a master basic discriminant function from the n-th order basic discriminant function f'nij(x, y) having the minimum value.

* * * * *